United States Patent

[11] 3,576,391

[72] Inventor William D. Houghton
Princeton, N.J.

[21] Appl. No. 740,383
[22] Filed June 26, 1968
[45] Patented Apr. 27, 1971
[73] Assignee RCA Corporation

[54] TELEVISION SYSTEM FOR TRANSMITTING AUXILIARY INFORMATION DURING THE VERTICAL BLANKING INTERVAL
9 Claims, 5 Drawing Figs.

[52] U.S. Cl. .......... 178/5.6, 178/7.1
[51] Int. Cl. .......... H04n 7/08, H04n 5/22
[50] Field of Search .......... 178/5.1, 5.6, 5.8, 6 (TM), 6 (F&M), 7.1

[56] References Cited

UNITED STATES PATENTS

| | | | |
|---|---|---|---|
| 2,874,213 | 2/1959 | Beers .......... | 178/5.6 |
| 3,491,199 | 1/1970 | Weinstein et al. .......... | 178/5.6 |
| 3,493,674 | 2/1970 | Houghton .......... | 178/5.6 |
| 3,507,985 | 4/1970 | Breukink et al. .......... | 178/5.6 |

*Primary Examiner*—Robert L. Richardson
*Attorney*—Eugene M. Whitacre

ABSTRACT: Gating and delay apparatus for rearranging the position of auxiliary message information to be transmitted together with primary program information over network distribution facilities during predetermined portions of the vertical blanking interval of a composite television signal, so as to minimize undesirable brightness modulation of the vertical retrace lines at the receiver's primary program image reproducer.

Figure 1A:
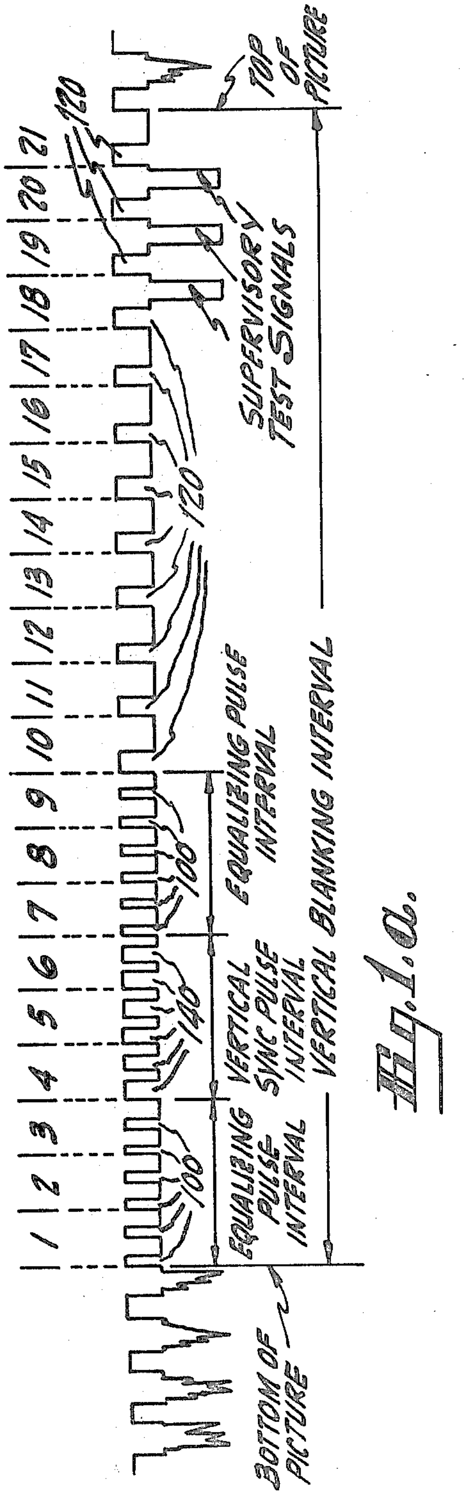

INVENTOR
WILLIAM D. HOUGHTON

BY Charles Brodsky
ATTORNEY

INVENTOR
WILLIAM D. HOUGHTON

BY Charles Brodsky
ATTORNEY

INVENTOR
WILLIAM D. HOUGHTON
BY Charles Brodsky
ATTORNEY

TELEVISION SYSTEM FOR TRANSMITTING AUXILIARY INFORMATION DURING THE VERTICAL BLANKING INTERVAL

This invention relates to the transmission of special message information to the public using existing television facilities, without interfering with regular television program service.

A system which accomplishes such transmission is disclosed in my pending application, Ser. No. 551,084, now U.S. Pat. No. 3,493,674, filed May 18, 1966, and entitled "TELEVISION MESSAGE SYSTEM." One embodiment of the system therein described sequentially multiplexes message representative line scan video signals developed by an auxiliary pickup camera with primary program video signals developed by a studio pickup camera during predetermined portions of the vertical blanking interval thereof, at a rate of one line scan signal per message per field of program information. More particularly, these video message signals are inserted during a time interval corresponding to that between successive horizontal synchronizing pulses within the vertical blanking interval of each program field. The composite signal is then transmitted to the home receiver in the usual manner, where apparatus is additionally included to separate the message signals from the rest of the received signal. The separated message signals may be recorded using a thin window type cathode ray tube and an associated Electrofax printer, while the primary program signals are displayed on the kinescope of the home receiver in the conventional way. As is described in U.S. Pat. No. 3,493,674 the thin window tube displays one horizontal line of message information, which is printed on the advancing paper of the Electrofax printer. Since the kinescope of the home receiver is cut off during the vertical blanking interval, the message information included therein is not displayed and thus does not interfere with the regular program picture as seen by the viewer.

In present television practice, the synchronizing signal waveform incorporates pulse components for horizontal and vertical synchronization and blanking. The portion of the waveform during vertical blanking and synchronization "sync" further incorporates equalizing components to minimize interaction of horizontal and vertical sync so as to insure proper interlace of successive fields in one television frame. In the standard synchronizing waveform currently in use in the United States, the vertical blanking interval occupies a time equal to approximately 20 horizontal scan lines in order to allow for deflection retrace in home receivers. It is current practice to use a portion of this vertical blanking interval for the insertion of test or supervisory signals for the benefit of those concerned with the generation, network transmission, and broadcasting of a television signal. These supervisory signals are commonly inserted within the last three or so horizontal spaces of the vertical blanking interval.

Some of the early model television receivers still in use, however, do not contain adequate retrace blanking. It has been found, for example, that when employed in the above-described message system environment, these receivers do not completely cut off during the vertical blanking interval, but tend to show the auxiliary signals there transmitted as undesirable brightness modulation on the vertical retrace lines. It has been further found that this modulation is most pronounced when the auxiliary message signals are inserted into the three horizontal spaces which follow the equalizing pulse interval after the vertical sync pulse period.

As will become clear hereinafter, apparatus embodying the present invention operates to delete the supervisory test signals included within the vertical blanking interval of a television synchronizing waveform and to substitute in their place, those auxiliary messages whose position tends to produce the above-described brightness modulation. Since the supervisory signals are for network and studio use only, they do not constitute a broadcast or communication service and the spaces they otherwise occupy can instead be employed for such broadcast purposes.

Figure 1B:
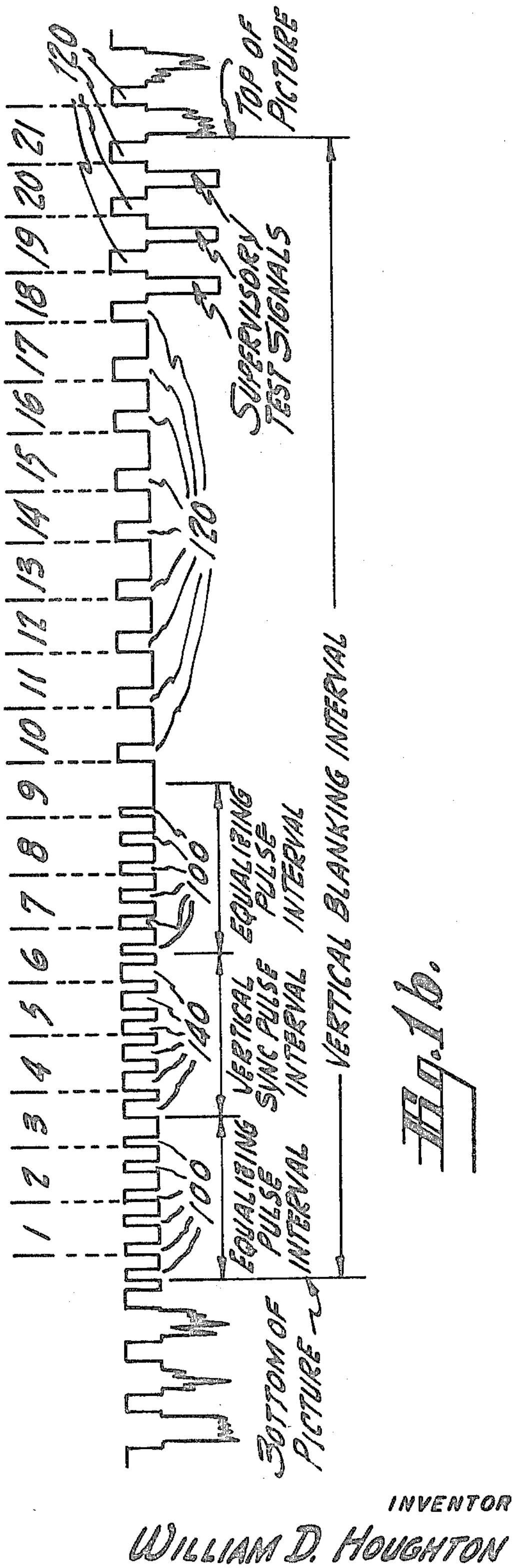
Figure 1C:
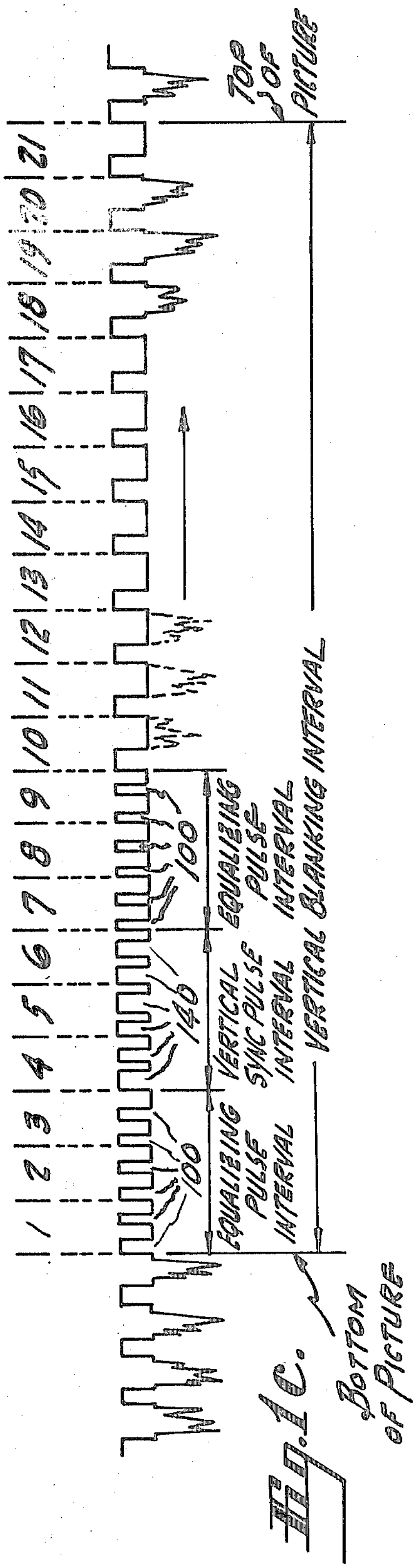
Figure 1D:
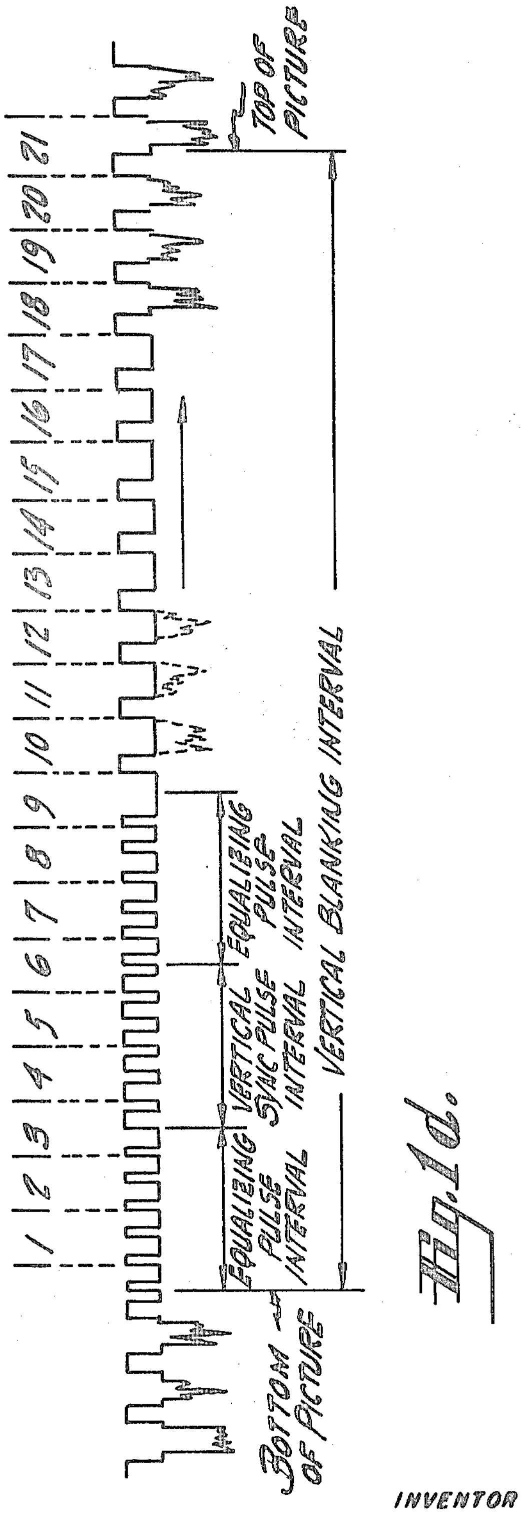
Figure 2:
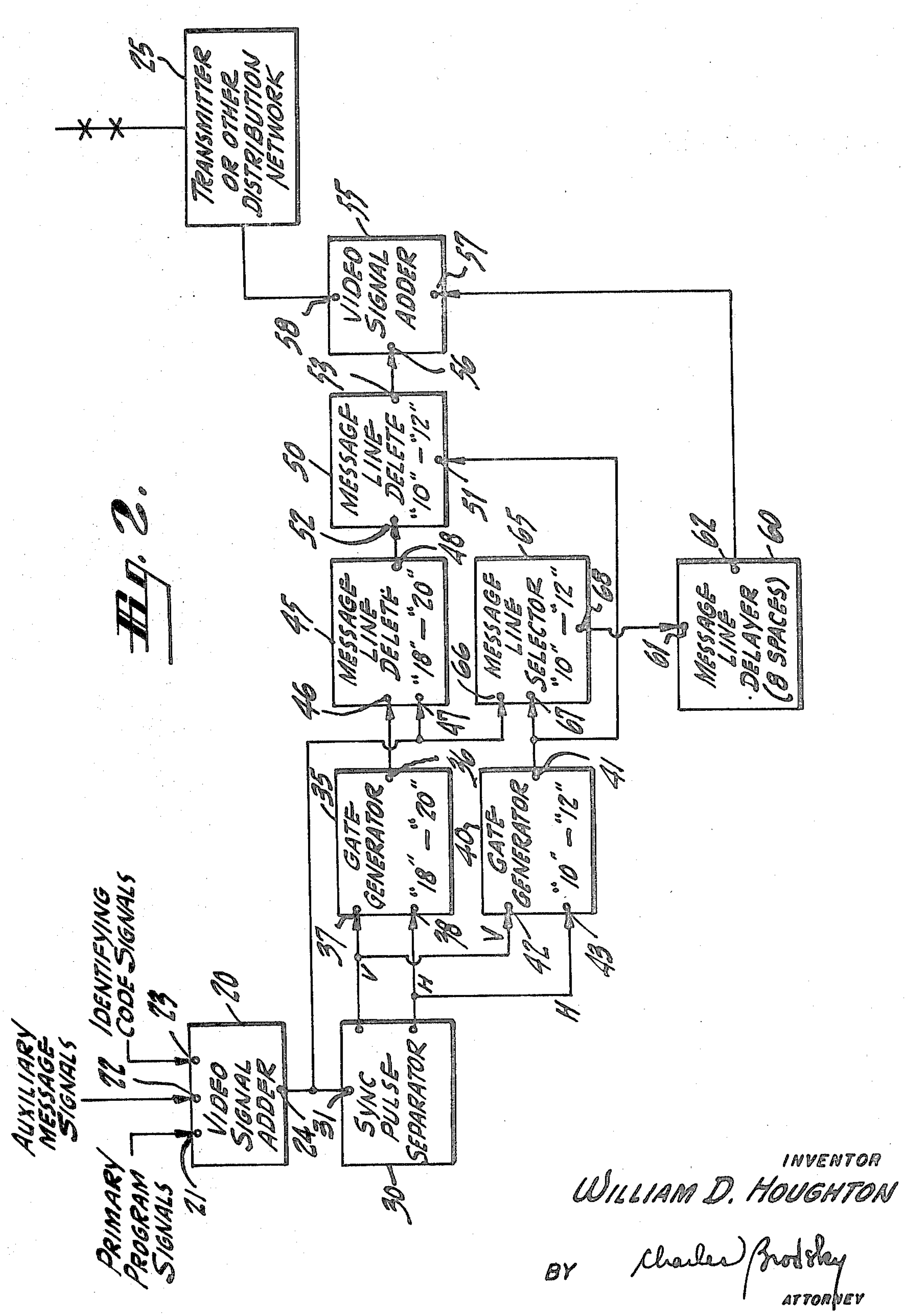

The novel features which are considered to be characteristic of the present invention are set forth with particularity in the appended claims. The invention, itself, however, both as to its organization and method of operation, and as to the advantages thereof, will best be understood by references to the following drawings in which:

FIGS. 1*a*—1*d* are a series of waveforms for alternate television scanning fields which are helpful in an understanding of the present invention; and FIG. 2 is a block diagram of apparatus embodying the invention.

Referring now to FIG. 1, the waveforms *a* and *b* respectfully illustrate (though not necessarily to scale) the vertical blanking interval for the even and odd fields of the interlaced television signal. As is well known, each of these intervals includes equalizing pulses 100, horizontal sync pulses 120, and serrated vertical sync pulses 140. The equalizing pulses 100 function to maintain vertical synchronization of a television receiver even though two interlaced scanning fields are utilized, while the horizontal sync pulses 120 maintain horizontal synchronization of the receiver during the latter portion of each of the vertical blanking intervals. The serrated vertical sync pulses 140 maintain horizontal synchronization of the receiver during the vertical sync pulse period.

The composite synchronizing signal depicted in waveforms FIG. 1*a* and 1*b* is also used to synchronize the horizontal deflection in the thin window cathode ray tube of the above-described television message system receiver. When used in such an environment, the composite synchronizing signal additionally includes auxiliary video message signals located, for example, in that space in the vertical blanking interval indicated in waveforms *a* and *b* by the numeral 16. Message identifying category code signals might further be included, in that space denoted 15, for example, as described in U.S. Pat. No. 3,493,674.

Waveforms FIG. 1*a* and 1*b* additionally illustrate the location in spaces 18—20 in the vertical blanking interval of the supervisory test signals useful to television networks, common carriers transmitting programs from city to city, and television broadcasting stations. It has been found that with insertion in these horizontal line spaces preceding the beginning of picture time, supervisory signals can be transmitted without undesirably interfering with the reception and reproduction of television pictures. It has also been found that insertion of these test signals, or of auxiliary message signals, in the horizontal line spaces denoted 10—12 undesirably caused brightness modulation on the vertical retrace lines of receivers incorporating inadequate retrace blanking.

The apparatus of the present invention, however, operates to eliminate this undesirable effect by deleting the supervisory test signals from horizontal spaces 18—20 of the synchronizing waveform as broadcast and to substitute in their place, those auxiliary messages originally scheduled for insertion into horizontal spaces 10—12.

Referring now to FIG. 2, the block diagram of the apparatus there shown includes a video signal adder 20 and, also, an output unit 25 which may comprise a television broadcast transmitter or other television signal distribution network. Coupled to the input terminal 21 of the adder 20, in a television message system of the type described, are the video signals representative of the primary program information. The video signals representative of the auxiliary message information, on the other hand, are coupled to the input terminal 22. Also coupled to the video adder 20, by means of its input terminal 23, is a code signal identifying the category or type of message (e.g. weather, sports, news, etc.) coupled to the terminal 22. In the manner set forth in U.S. Pat. No. 3,493,674, these three input signals are combined in the adder 20 to form an output signal comprising a regular program signal during the picture interval of the combined signal and an added coded, single line message signal during the vertical blanking interval. Whereas this composite signal in the patented system was coupled by means of a cable directly to the output unit for transmission to the viewer in a conventional manner, it will be understood that, according to the present invention, additional equipment is included between units 20 and 25. This will become clear from the following description.

The apparatus of the invention as embodied in FIG. 2 also includes a synchronizing pulse separator 30 and a pair of gate generators 35 and 40. The separator 30 is coupled via its input terminal 31 to the output terminal 24 of the video signal adder 20, and operates both to select the composite synchronizing signal from the program video and to couple the vertical and horizontal components thereof to the generators 35 and 40 via terminals 37, 38 and 42, 43. As indicated in FIG 2, the generator 35 is arranged to produce gate or enabling pulses at its output terminal 36 which are timed to coincide with the horizontal spaces 18—20 during the vertical blanking interval into which the supervisory test signals are inserted. Similarly, the generator 40 is arranged to produce enabling pulses at its output terminal 41 which are in time coincidence with the horizontal spaces 10—12, the spaces where inserted message information may cause undesired brightness modulation of the type described.

A pair of message line delete units 45 and 50 and a second video signal adder 55 are additionally included in the apparatus of FIG. 2. The units 45 and 50, basically, are each gated amplifier units that are controlled by the timing pulses developed by the gate generators 35 and 40, respectively, and applied to their input terminals 46 and 51. When so controlled by generator 35, unit 45 serves to delete any supervisory test signals that may exist in horizontal spaces 18—20 within the vertical blanking portion of the composite signal applied to its input terminal 47 from the output terminal 24 of video adder 20. The remainder of the composite signal, i.e., the composite signal with supervisory information deleted, is coupled from the unit 45 via its output terminal 48 to input terminal 52 of the unit 50 where, under the control of the timing pulses from the generator 40, any message information present in horizontal spaces 10—12 is likewise deleted from the composite signal. The signal developed at output terminal 53 of the message delete unit 50, containing at most auxiliary information in the spaces 13—17 and 21, is applied, as shown, to input terminal 56 of the second adder unit 55.

Also coupled to the adder unit 55, via its input terminal 57, is a message line delayer 60, which, in turn, is coupled by means of a message line selector 65 to the output terminal 24 of adder 20 and to the output terminal 41 of the gate generator 40. The line selector 65 is arranged to select predetermined auxiliary message lines of the composite signal applied to its input terminal 66 under the control of the gating pulses generated by the unit 40 and applied to its terminal 67. With the system arrangement as herein described, the generator 40 and the line selector 65 cooperate to provide the auxiliary messages inserted in horizontal space 10—12 as an output at the terminal 68 and to apply those messages to input terminal 61 of delay unit 60. As indicated in the drawing, the unit 60 is set to delay the auxiliary messages of spaces 10—12 for a time equal to 8 horizontal spaces, and to apply the messages as delayed from its output terminal 62 to the input terminal 57 of the signal adder. It will be readily apparent that the output signal developed by the adder 55 from the resultant mixing of signals from the units 50 and 60 comprises a composite signal in which horizontal spaces 18—20 of its vertical blanking interval contain the auxiliary message information previously contained within spaces 10—12. It will also be apparent that horizontal spaces 10—12 are devoid of any message information. This signal appears at terminal 58 of the adder 55.

The output signal of adder 55 is shown applied to the transmitter or distribution network unit 25. Because spaces 10—12 no longer have any message information included therein, it will be understood that the brightness modulation caused by such information in home receivers having inadequate retrace blanking is eliminated. As was previously mentioned, no such undesirable modulation is caused by message information in horizontal spaces 18—20, and no broadcast for communication service as far as the home viewer is concerned is lost due to the removal of the supervisory test signals from the composite video signal transmitted to his receiver.

Waveforms FIG. 1*c* and 1*d* respectively illustrate the vertical blanking interval for the even and odd fields of the interlaced television signals emanating from the output unit 25 of FIG. 2. The translation of inserted auxiliary message information from horizontal spaces 10—12 to 18—20 and the omission of any information in spaces 10—12 will be readily apparent.

While the apparatus of the present invention has been described in an environment where auxiliary message signals were translated from one specific portion in the vertical blanking interval of a composite television signal to another specific portion (spaces 10—12 to 18—20), it will be appreciated that its teachings are not so limited. By adjusting the timing of either or both of the gate generators 40 and 45 and/or the delay imparted by the unit 60, it will be noted that auxiliary message signals may be translated from one space to any other space within the vertical blanking interval. It will also be noted that the imparted delay may be such as to shift the auxiliary message signals from a position in the vertical blanking interval to a corresponding position within the television raster itself. Such a latter scheme is particularly attractive where the auxiliary transmissions are to be maintained secret or where reception is to be on a subscription basis. There, the shifting can be in a coherent or random manner, with the auxiliary information being recoverable only when the shifting pattern is known and programmed into the viewer's home message receiver.

I claim:

1. The combination comprising:

first means for generating a composite television signal waveform including field scanning rate and line scanning rate pulses within the vertical blanking interval thereof, and also including auxiliary signals positioned within predetermined portions of said blanking interval;

second means coupled to said first means and responsive to said field and line scanning rate pulses for separating from said interval those auxiliary signals whose position within said composite signal waveform it is desired to rearrange;

third means also coupled to said first means and responsive to said field and line scanning rate pulses for deleting any signals included in said television signal waveform in positions where said separated signals are to be relocated;

and fourth means coupled to said second and third means for reinserting said separated signals in those positions in said television signal waveform previously occupied by said deleted signals.

2. The combination as defined in claim 1 wherein said separated auxiliary signals are reinserted within said television signal waveform at a later time than the positions said separated signals previously occupied within said waveform.

3. The combination as defined in claim 1 wherein the auxiliary signals generated by said first means within said vertical blanking interval, the position of which it is desired to rearrange, comprise line scan video signals representative of auxiliary television message information.

4. The combination as defined in claim 1 wherein said second means includes gate generator means for providing first control pulses timed to substantially coincide with those positions within said vertical blanking interval which include the auxiliary signals to be separated from said television signal waveform, and wherein said second means additionally includes message line selector means coupled to receive said composite signal waveform and enabled by said first control pulses for selecting, and thereby separating, those auxiliary signals desired for rearrangement within said blanking interval.

5. The combination as defined in claim 4 wherein said third means includes gate generator means for providing second control pulses timed to substantially coincide with those positions within said vertical blanking interval in which said separated auxiliary signals are to be reinserted, and wherein said third means additionally includes message line delete means coupled to receive said composite television signal waveform and enabled by said second control pulses for deleting from those positions within said blanking interval those auxiliary signals previously occupying such positions and for further providing the remainder of said television signal waveform as an output therefrom.

6. The combination as defined in claim 5 wherein said fourth means includes delay means coupled to said message line selector means for delaying said selected auxiliary signals for rearrangement for a time period substantially corresponding to that between their separated and relocated positions within said vertical blanking interval, and wherein said fourth means additionally includes adder means coupled to said message line delete means and to said delay means for adding said delayed auxiliary signals to the remainder of said television signal waveform developed as an output by said delete means.

7. The combination as defined in claim 6 wherein said vertical blanking interval includes first and second equalizing pulse periods separated by a synchronizing pulse period of comparable duration, and wherein auxiliary signals initially positioned within said blanking interval in proximate relationship to the end of the one of said first and second equalizing pulse periods furthest from the beginning of said interval are deleted by said third means in response to signals from said gate generator in said second means.

8. The combination as defined in claim 7 wherein said deleted auxiliary signals are reinserted at a later position than previously occupied during said blanking interval by said fourth means.

9. In a television distribution system wherein auxiliary information is multiplexed into the vertical blanking interval of the television broadcast signal and wherein it is desired to relocate auxiliary information from one horizontal line interval in said vertical blanking interval to a different horizontal line interval, circuit means comprising:

a source of composite television signals, synchronizing separator means coupled to said source for separating horizontal and vertical synchronizing signals from said composite television signal, pulse generating means responsive to horizontal and vertical sync pulses from said synchronizing separator means and preselected to produce a first pulse in time coincidence with the horizontal line interval in which said auxiliary information to be deleted is present, and a second pulse in time coincidence with the horizontal line interval in which said auxiliary information is to be relocated, line delete means coupled to said source of composite signals and to said pulse generator means and responsive to said first and second pulses to remove information in those horizontal line intervals in time coincidence with said first and second pulses, line delayer means having input and output terminals and preselected to delay a signal at its input terminal an integral number of horizontal lines and which couples the delayed signal to its output terminal, line selector means coupled to said pulse generating means, to said source of composite television signals, and to said line delayer means and responsive to said first pulse to apply information only in the horizontal line interval in time coincidence with said first pulse to said line delayer means, and signal adding means coupled to said line delete means and to said line delayer means for adding said delayed signal to the remaining composite television signal.